United States Patent [19] … [11] Patent Number: 5,343,991
Premiski et al. … [45] Date of Patent: Sep. 6, 1994

[54] ROLLER ELEMENT OVERRUNNING CLUTCH

[75] Inventors: Vladimir Premiski, Willerscheidt; Wilhalm Wehren, Blatzheim; Mark Silk, Cologne; Sieghart Biedermann, Max-Liebermann-Strasse all of Fed. Rep. of Germany

[73] Assignee: Ford Motor Company, Dearborn, Mich.

[21] Appl. No.: 55,591

[22] Filed: May 3, 1993

[30] Foreign Application Priority Data

Jun. 11, 1992 [DE] Fed. Rep. of Germany ....... 4219154

[51] Int. Cl.$^5$ ................. F16D 15/00; F16D 41/00; F16C 19/54; F16C 33/48
[52] U.S. Cl. .................... 192/45; 192/110 B; 384/455; 384/560; 384/572
[58] Field of Search .............. 192/45, 110 B; 475/292, 475/324; 384/504, 512, 452, 455, 537, 539, 560, 572

[56] References Cited

U.S. PATENT DOCUMENTS

| | | | |
|---|---|---|---|
| 3,765,736 | 10/1973 | Pitner | 384/455 |
| 3,809,444 | 5/1974 | Eckhardt et al. | 384/455 |
| 4,953,353 | 9/1990 | Lederman . | |
| 5,062,512 | 11/1991 | Lederman . | |
| 5,074,393 | 12/1991 | Itomi | 192/45 |
| 5,078,243 | 1/1992 | Kanai et al. . | |
| 5,129,495 | 7/1992 | Johnston et al. | 192/45 X |
| 5,199,801 | 4/1993 | Grehn et al. | 384/512 X |

FOREIGN PATENT DOCUMENTS

| | | |
|---|---|---|
| 2352820 | 5/1974 | Fed. Rep. of Germany . |
| 2758841 | 7/1979 | Fed. Rep. of Germany . |
| 3612046 | 10/1987 | Fed. Rep. of Germany . |
| 0291550 | 11/1988 | Fed. Rep. of Germany . |

*Primary Examiner*—Rodney H. Bonck
*Attorney, Agent, or Firm*—Frank G. McKenzie; Rober L. May

[57] ABSTRACT

A overrunning clutch having a lateral rolling bearing, wherein clamping elements (21) and rolling elements (23) are carried in respective separate cages (22 and 24) between an inner ring (15) and an outer ring (16). The rings are provided with tracks (17, 19 and 20) adapted to the clamping and rolling elements. The breadth of the rings exceeds the length of the clamping elements (21), the cages (22 and 24) adjoin one another, and at least one of the cages (22) is snap-fitted and axially secured by means of radial projections (27) in an annular groove (28) in one of the rings. The clamping element cage (22) has, adjacent the rolling bearing, an axial shoulder (25) and a radial flange part (26). The rolling bearing cage (24) has axially projecting annular beads (29 and 30), one of which merges into a radial guide flange (31), which is guided axially between the annular shoulder (18) and the adjacent flange part (26) of the free-wheel cage (22) and radially by the shoulder (25).

6 Claims, 1 Drawing Sheet

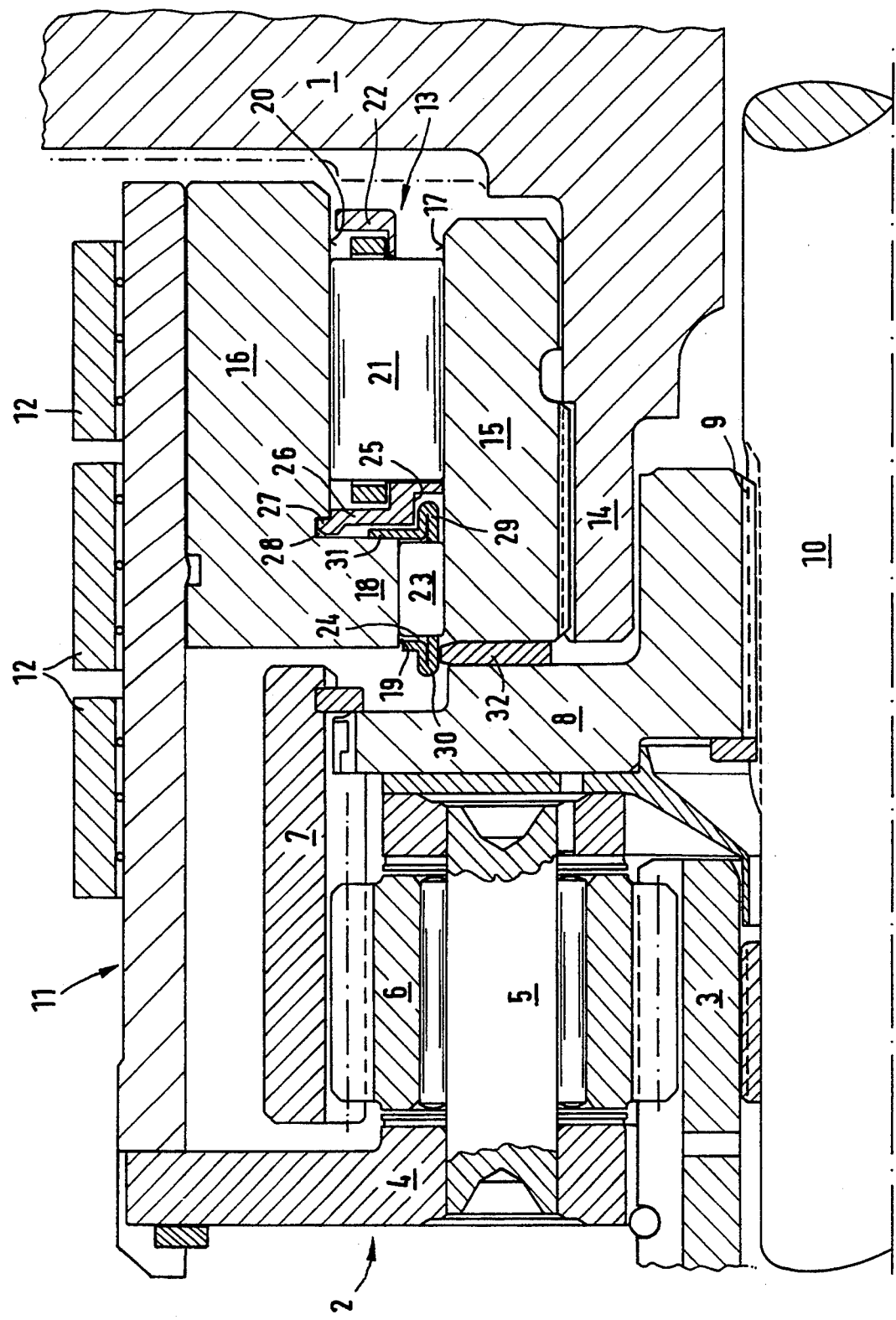

ROLLER ELEMENT OVERRUNNING CLUTCH

BACKGROUND OF THE INVENTION

1. Field of the Invention

The invention relates to overrunning clutches of the type having a roller element or clamping element and a lateral additional rolling bearing.

2. Description of the Prior Art

German Patent Specification 36 12 046 describes a roller- or clamping-element overrunning clutch, particularly for automatic transmissions, in which the clamping elements, carried by a clamping element cage, are arranged between an inner ring and outer ring. Lateral additional sliding bearing rings are arranged adjacent to the immediate neighborhood of the clamping element overrunning clutch in order to lend additional support to the outer ring. The clamping element cage is made of plastic material and is secured axially in a groove in the internal diameter of the outer ring by means of radial projections (see FIG. 4). The lateral sliding bearing rings have axially projecting rim regions which interlock with corresponding rim regions, of the cage. Adjacent components of the automatic transmission such as, for example, an adjacent planet gear carrier, are supported axially by means of conventional thrust washers or needle bearings.

German Patent Specification 27 58 841 describes a roller- or clamping-element overrunning clutch with a lateral additional rolling bearing. It has clamping elements and rolling elements carried in separate cages arranged between an inner ring and outer ring, the rings being provided with tracks adapted to the rolling elements. The breadth of the rings considerably exceeds the length of the clamping elements. The separate cages are mutually adjacent, and at least one of the cages is secured axially by means of a fastening member, snap-fitted into an annular groove in one of the rings.

Various embodiments of a combination of a clamping element overrunning clutch with a needle or roller bearing or with a deep groove ball bearing are illustrated. One embodiment cannot resist axial forces, but the other embodiment can do so.

European Patent Specification 0 291 550 describes a clamping element overrunning clutch having a double cage. At least part of the clamping element cage, the outer cage ring, is of plastic material. It interlocks by means of outwardly projecting radial projections with a groove in the inner circumference of the outer ring and by means of laterally projecting axial projections with lateral additional sliding bearing rings.

SUMMARY OF THE INVENTION

It is an object of the invention to improve a roller-element or clamping-element overrunning clutch of the kind having clamping elements and rolling elements carried in respective separate cages between an inner ring and an outer ring, wherein the rings are provided with tracks adapted to the clamping and rolling elements respectively, the breadth of the rings exceeds the length of the clamping elements, the separate cages adjoin one another and at least one of the cages is snap-fitted and axially secured by fastening means in an annular groove in one of the rings.

An object of the invention is to obtain accurate axial and radial positioning of the two assemblies of the roller-element or clamping-element overrunning clutch by means of rolling bearings, while still ensuring that the individual assemblies have the degree of freedom required by their different rates of rotation.

To this end, according to the invention a roller-element or clamping-element overrunning clutch having a lateral additional rolling bearing includes a radially extending flange part formed on the free-wheel cage, adjacent a rolling bearing, which is snap-fitted into an annular groove in the outer ring by means of radial projections, a radial guide flange on the rolling bearing cage is formed adjacent the free-wheel, which is fixed in position between one side of the annular groove and the adjacent flange part.

By forming on the free-wheel cage, adjacent the rolling bearing, a radially extending flange part that is snap-fitted into an annular groove in the outer ring by means of radial projections, and forming on the rolling bearing cage, adjacent the free-wheel, a radial guide flange that is received and axially fixed between one side of the annular groove and the adjacent flange part, simple and reliable axial securing of the free-wheel and rolling bearing assemblies is obtained.

Because one shoulder of the annular groove in the outer ring merges into an annular shoulder, and the radial guide flange of the rolling bearing cage is received and axially fixed between the annular shoulder, the axial fixing is obtained in the case where the radial extent of the rolling elements differs greatly from that of the clamping elements.

By forming an axially projecting shoulder on the free-wheel cage adjacent the rolling bearing, and forming on the rolling bearing cage at least one annular bead projecting axially to one side that merges into the radial guide flange and provides, through its annular bead, radial guidance to the axially projecting shoulder of the free-wheel cage, radial centering is obtained in addition to axial securing.

By forming on the rolling bearing cage a second annular bead projecting axially to the other side thereof, radial guidance is provided for the adjacent axial rolling or sliding bearing.

BRIEF DESCRIPTION OF THE DRAWING

The invention will now be described in more detail, by way of example, with reference to an embodiment shown in the drawing, which depicts a partial vertical cross section through a region of an automatic transmission for motor vehicles.

DESCRIPTION OF THE PREFERRED EMBODIMENT

In the figure, a transmission housing 1 has arranged therein a set of planet gears 2, which forms part of a Simpson planet gear set that shares a common sun wheel 3 with another set of planet gears (not shown). Rotatably journalled on a planet gear carrier 4, by way of planet gear axles 5, are planet pinions 6, which mesh with a ring gear 7, which is drivingly connected via a hub component 8 and splines 9 to the driven shaft 10 of the transmission. The planet gear carrier 4 is connected in known manner to a brake drum 11, which, by means of an associated brake band 12, enables the planet gear carrier 4 to be secured in both directions of rotation.

However, the brake drum 11 can be supported in only one direction of rotation on a projection 14 of the transmission housing 1 by means of a roller-element or clamping-element overrunning clutch 13.

The roller-element or clamping-element overrunning clutch 13 comprises an inner ring 15, which is secured on the projection 14 of the housing 1, and an outer ring 16, which may be a thickened part of the brake drum 11. Alternatively the brake drum may, as shown in the figure, be in two parts, namely a cylindrical brake drum sleeve 11 and an outer ring 16, fastened thereto by press fitting or shrink fitting.

The outer circumference of the inner ring 15 forms an inner external track surface 17. The outer ring 16 forms on an annular shoulder 18 a first internal track surface 19 and, at its opposite end, a second internal track surface 20.

Located between the external track surface 17 and the internal track surface 20 there are clamping or roller elements 21, carried in a free-wheel cage 22. The rollers 21 driveably engage surface 17 and 20 to transmit torque in a first direction therebetween, and disengage the surface 17,20 when torque is applied in a direction opposite the first direction. Located between the external track surface 17 and the internal track surface 19 there are rolling elements 23, carried in a rolling element cage 24.

The free-wheel cage 22 of the clamping element device 21/22 is provided on its side adjacent to the rolling bearing device 23/24 with an axially projecting shoulder 25 and a radially extending flange part 26 having radial projections 27, by which it is secured axially in an annular groove 28 in the outer ring 16.

The rolling bearing device 23/24 has on its rolling bearing cage 24 lateral axially projecting annular beads or shoulders 29 and 30, of which the annular bead 29 adjacent the clamping element device merges into a radially extending guide flange 31.

An axial bearing 32, in the form of an axial needle bearing or an axial thrust washer, is provided between the fixed inner ring 15 and the adjacent hub 8 of ring gear 7.

The radial guide flange 31 formed on the rolling bearing cage 24 is secured between the annular shoulder 18 on the outer ring 16 of the brake drum 11 and the adjacent flange part 26 on the free-wheel cage 22, with a suitable amount of axial play. The rolling bearing cage 24 is guided radially on the axially projecting shoulder 25 on the free-wheel cage 22 by means of its axially projecting annular bead 29. By means of the axially projecting annular bead 30 on its other side, the rolling bearing cage 24 radially centers the adjacent axial bearing 32. However, this bearing can obviously also be secured and centered in other conventional ways.

Securing the rolling bearing cage 24 axially, in accordance with the invention, by means of the radial guide flange 31 located between the annular shoulder 18 and the flange part 26 of the free-wheel cage 22 enables a unit comprising the brake drum 11, clamping element and rolling bearing devices 21/22 and 23/24 to be preassembled, thereby ensuring the required degree of freedom for the different speeds of rotation of the two adjacent cage devices.

We claim:

1. An overrunning clutch for producing one-way drive, comprising:
    an inner ring;
    an outer ring surrounding the inner ring;
    a roller located between the inner ring and outer ring, driveably engaging said rings and producing a driving connection therebetween in a first direction of rotation, driveably disengaging said rings in a second direction of rotation;
    a first cage containing the roller;
    fastening means for restraining movement of the first cage against displacement relative to the outer ring;
    a rolling element located between the inner ring and outer ring, rotatably supporting said rings for relative rotation in the first and second directions therebetween;
    a second cage containing the rolling element, having a guide flange located between a surface of the outer ring and the fastening means, thereby restraining said second cage against displacement therebeyond.

2. The overrunning clutch of claim 1 wherein the fastening means for the first cage comprises an annular groove formed in the outer ring, and a projection on the first cage engaged with the groove, said groove and projection elastically releasably connecting the first cage and outer ring.

3. The overrunning clutch of claim 2 wherein:
    the first cage includes a second shoulder located adjacent the rolling element;
    the second cage includes a first annular bead located radially adjacent the second shoulder, the second shoulder restraining radial movement of the second cage due to contact with the first bead.

4. The overrunning clutch of claim 1 wherein the fastening means for the first cage comprises:
    an annular groove formed in the outer ring;
    a projection on the first cage engaged with the groove on the outer ring;
    the outer ring includes an annular first shoulder extending radially and located adjacent the guide flange and projection,
    the guide flange located between the first shoulder and the projection, the first shoulder and projection restraining said second cage against displacement.

5. The overrunning clutch of claim 1 wherein:
    the first cage includes a second shoulder located adjacent the rolling element;
    the second cage includes an annular bead located radially adjacent the second shoulder, the second shoulder restraining radial movement of the second cage due to contact with the first bead.

6. The overrunning clutch of claim 5 further comprising:
    a bearing located adjacent the inner ring; and
    wherein the second cage includes a second annular bead projecting away from the first bead, the second bead located adjacent the bearing and adapted to restrain the bearing against movement relative to the second cage due to contact by said bearing on the second bead.

* * * * *